(12) United States Patent
Kuester et al.

(10) Patent No.: US 10,917,843 B1
(45) Date of Patent: Feb. 9, 2021

(54) CELL SELECTION AND RESELECTION ALGORITHM FOR LTE OVER SATELLITE

(71) Applicant: Lockheed Martin Corporation, Bethesda, MD (US)

(72) Inventors: Andrew James Kuester, Wheaton, MD (US); Joseph J. Baldasano, Blue Bell, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/010,716

(22) Filed: Sep. 2, 2020

(51) Int. Cl.
| | | |
|---|---|---|
| *H04W 40/00* | (2009.01) | |
| *H04W 48/20* | (2009.01) | |
| *H04W 48/16* | (2009.01) | |
| *H04W 64/00* | (2009.01) | |
| *H04W 36/00* | (2009.01) | |
| *H04W 36/08* | (2009.01) | |
| *H04W 36/36* | (2009.01) | |
| *H04W 36/22* | (2009.01) | |
| *H04B 7/08* | (2006.01) | |
| *H04W 88/02* | (2009.01) | |
| *H04B 7/185* | (2006.01) | |
| *H04W 84/06* | (2009.01) | |

(52) U.S. Cl.
CPC ............ *H04W 48/20* (2013.01); *H04B 7/088* (2013.01); *H04W 36/00835* (2018.08); *H04W 36/08* (2013.01); *H04W 36/22* (2013.01); *H04W 36/36* (2013.01); *H04W 48/16* (2013.01); *H04W 64/00* (2013.01); *H04B 7/086* (2013.01); *H04B 7/1853* (2013.01); *H04W 84/06* (2013.01); *H04W 88/02* (2013.01)

(58) Field of Classification Search
CPC ...... H04W 16/28; H04W 84/06; H04W 16/26
See application file for complete search history.

(56) References Cited

U.S. PATENT DOCUMENTS

| | | | |
|---|---|---|---|
| 2012/0106346 A1* | 5/2012 | Aguirre | H04W 28/08 370/237 |
| 2014/0073331 A1* | 3/2014 | Lee | H04W 72/048 455/444 |
| 2019/0123809 A1* | 4/2019 | Oza | H04W 4/021 |
| 2020/0045725 A1* | 2/2020 | Mochizuki | H04W 72/046 |
| 2020/0296625 A1* | 9/2020 | Pettersson | H04W 24/10 |

* cited by examiner

*Primary Examiner* — Khalid W Shaheed
(74) *Attorney, Agent, or Firm* — Morgan, Lewis & Bockius LLP (57) ABSTRACT

According to various aspects of the subject technology, methods and systems for providing cell selection and reselection for Long Term Evolution (LTE) communications over satellite are provided. The disclosure addresses several problems specific to satellite over LTE, including compensation of beam coverage extending beyond the physical location of the beam due to flatness of the beam, load balancing of cells with overlapping coverage, and modified cell selection in a single provider network when no suitable cells are found.

20 Claims, 7 Drawing Sheets

FIG. 6

CELL SELECTION AND RESELECTION ALGORITHM FOR LTE OVER SATELLITE

STATEMENT REGARDING FEDERALLY SPONSORED RESEARCH OR DEVELOPMENT

Not applicable.

FIELD

The present disclosure generally relates to signal processing and communication, and more specifically relates to methods and systems for providing cell selection and reselection for Long Term Evolution (LTE) communications over satellite.

BACKGROUND

Cell selection is the procedure by which a device selects a cell for camping to obtain service in a telecommunications system. Some deployments and use cases may require cell selection to be carried out by Mobile Satellite Equipment (MSE). However, the existing 3GPP LTE specifications define cell selection for terrestrial usage only. Accordingly, there is a need for improved systems and methods for cell selection that are applicable to MSE.

SUMMARY

According to various aspects of the subject technology, cell selection and reselection algorithms for LTE over satellite are disclosed. To prevent a single Satellite Access Controller (SAC) from being overloaded, a load balancing algorithm is disclosed to distribute subscribers evenly among the base stations. Satellite Base Station Equipment (SBSE) may also broadcast a load level flag to enable idle mode load distribution across cells. Additionally, since the power from beams in a satellite broadcast environment may extend beyond the physical location of the beam itself, the MSE may use Global Positioning System (GPS) location information, when available, to assist in selecting a cell in range suitable for camping in the satellite environment. Further adaptations for operation in the satellite environment are also disclosed, such as continuing to search for suitable cells in any cell selection when no suitable cell is found, thereby providing a fallback even when only a single provider is available. The disclosed systems and methods solve the problems associated with LTE over satellite deployments.

In the following description, reference is made to accompanying attachments that form a part thereof, and that show by way of illustration, specific embodiments in which the subject technology may be practiced. It is to be understood that other embodiments may be utilized and changes may be made without departing from the scope of the subject technology.

DETAILED DESCRIPTION

Figure 1:
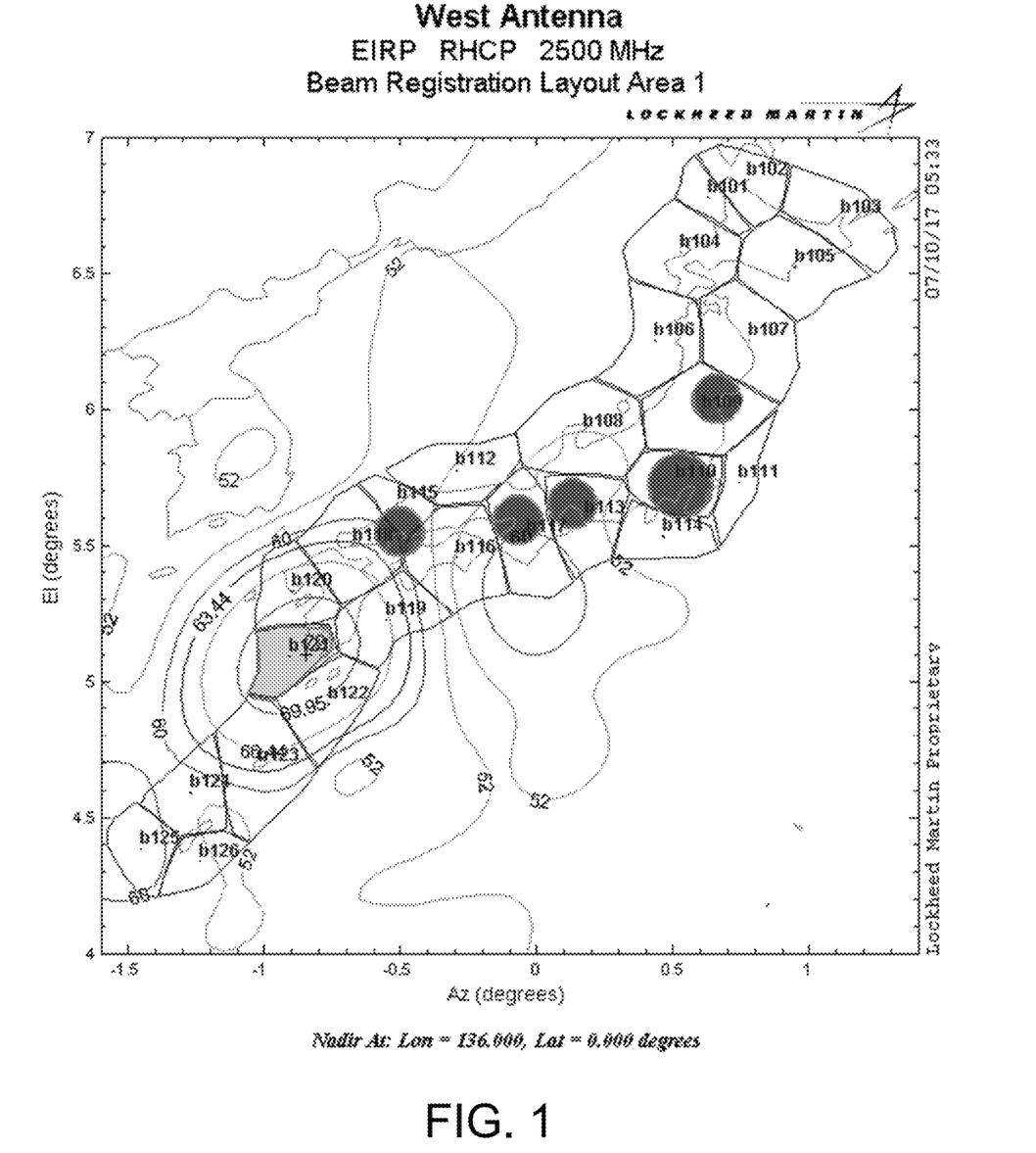
FIG. 1 depicts an example map of satellite beam/cell patterns for a satellite-based LTE system.

Compared to terrestrial LTE, LTE over satellite presents several challenges. For example, referring to FIG. 1, an example of a coverage map is shown for a satellite-based LTE system. As discussed above, in satellite broadcast environments, the broadcast power may extend beyond the physical location of the beam due to the flatness of the beam. Further, the same geographic territory may be covered by multiple satellite beams from a single provider. Thus, cell selection and re-selection for mobile satellite equipment cannot be readily determined based on beam power and regional PLMN alone.

To address the discrepancy between power and beam coverage in satellite broadcast environments, a location assist is provided. The SBSE may broadcast metadata regarding the beam shape of the broadcasted beam. The MSE may use location sensors, such as GPS sensors, to determine whether the MSE is within range of the shape or is excluded by the shape. When the MSE is within range, a connection is possible to the SBSE and thus the cells in the beam are potential candidates for camping. Additionally, the SBSE may broadcast a load indication to allow MSEs to select cells in a load balanced manner by preferring to camp on non-loaded cells before loaded cells, and by camping among available cells via a uniform distribution function, which may, for example, be based on a hardware identifier or a random/pseudo-random value from each MSE. Further, since the satellite network may be deployed by a single provider entity rather than multiple different PLMNs as in a terrestrial base station environment, the cell selection algorithm for LTE over satellite may be modified to continue to search for suitable cells in any-cell selection as a fallback when a preferred cell cannot be found. In the any-cell selection, cells previously rejected as being excluded by the beam shape may be reconsidered for camping.

Figure 2:
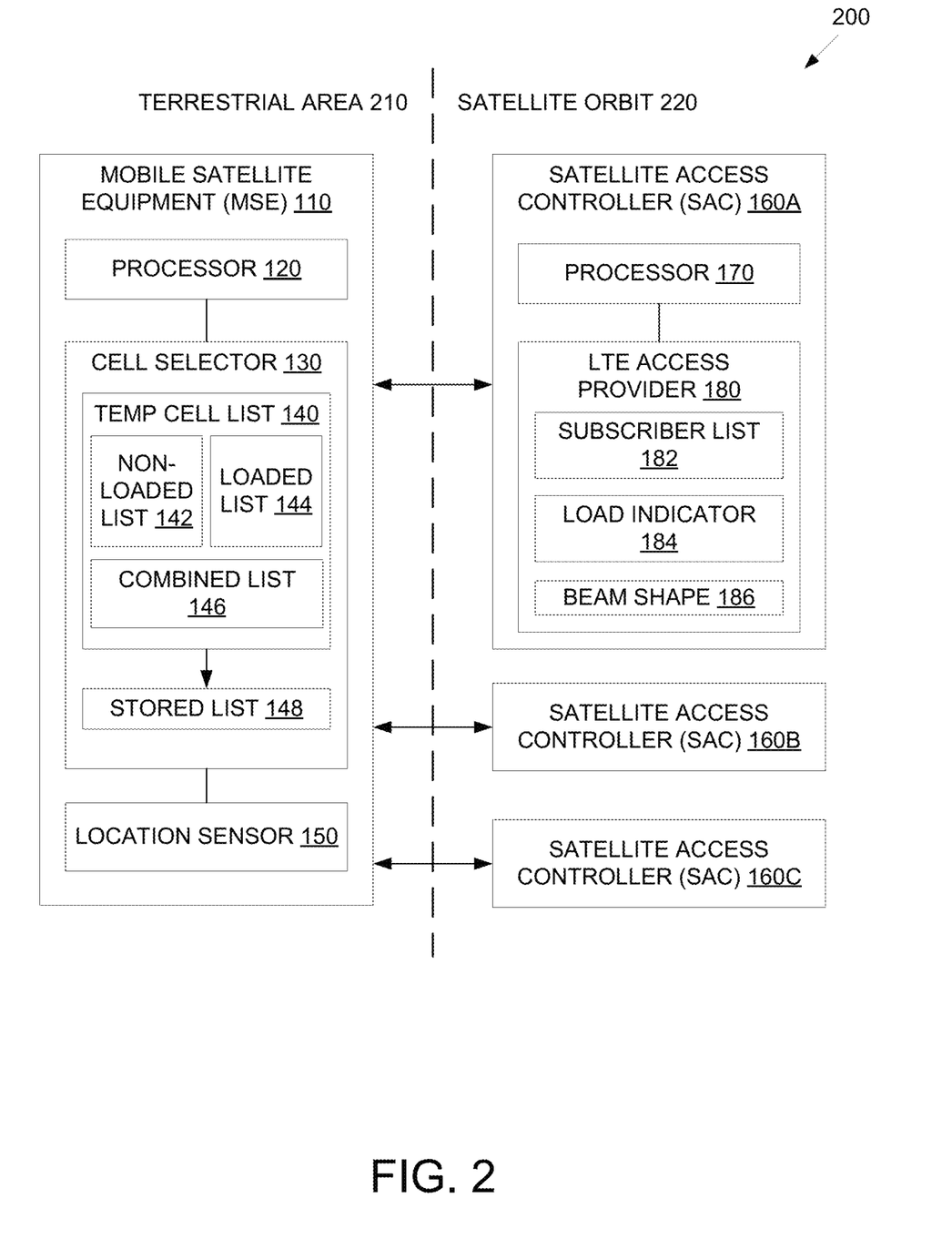
FIG. 2 depicts an example system in which cell selection and reselection for LTE may be provided, according to various aspects of the subject technology.

FIG. 2 depicts an example system 200 in which cell selection and reselection for LTE may be provided, according to various aspects of the subject technology. Mobile satellite equipment (MSE) 110, such as a mobile phone, is located in terrestrial area 210, and can connect to satellite base station equipment (SBSE), or satellite access controllers (SAC) 160A, 160B, and 160C in satellite orbit 220. While a single MSE 110 and three SACs 160A-160C are shown for explanatory purposes, it should be understood that any number of MSEs can connect to any number of potential SACs.

MSE 110 may include processor 120, cell selector 130, and location sensor 150. Processor 120 may correspond to any general purpose or specialized processor including an application specific integrated circuit (ASIC) or a field programmable gate array (FPGA). Cell selector 130 may manage the selection or reselection of a cell for camping to obtain network service via LTE over satellite. As shown in FIG. 2, cell selector 130 may include various data structures in a temp cell list 140, including non-loaded list 144, loaded list 144, and combined list 146. These structures will be described in greater detail below in conjunction with FIG. 4A. Further, a stored list 148 may be stored in a non-volatile memory of MSE 110 to maintain a list of previously camped cells, for example to find a suitable cell when a reconnection to a last camped cell fails. In some implementations, the stored list 148 may be capped to a maximum number of cells, such as 10 cells, wherein the oldest cell is deleted after reaching the cap. Location sensor 150 may, for example, include a GPS sensor, allowing MSE 110 to track its current location.

SAC 160A may include processor 170 and LTE access provider 180. SAC 160B and 160C may also include elements similar to SAC 160A. Processor 170 may execute LTE access provider 180 to provide LTE network connectivity to MSE, such as MSE 110, via satellite connection. LTE access provider 180 may maintain a subscriber list 182 of MSE camped on cells associated with SAC 160A. Based on subscriber list 182 and available free cell capacity, load indicator 184 may be updated to indicate the load state of each cell. In some implementations, load indicator 184 may be a binary value to indicate loaded (L) or not loaded (NL). LTE access provider 180 may also maintain beam shape 186, which describes the shape of the satellite beams broadcasted from satellite orbit 220 to terrestrial area 210. SAC 160A may also transmit load indicator 184 and beam shape 186 to MSE 110 for range checking and load balancing.

Figure 3:
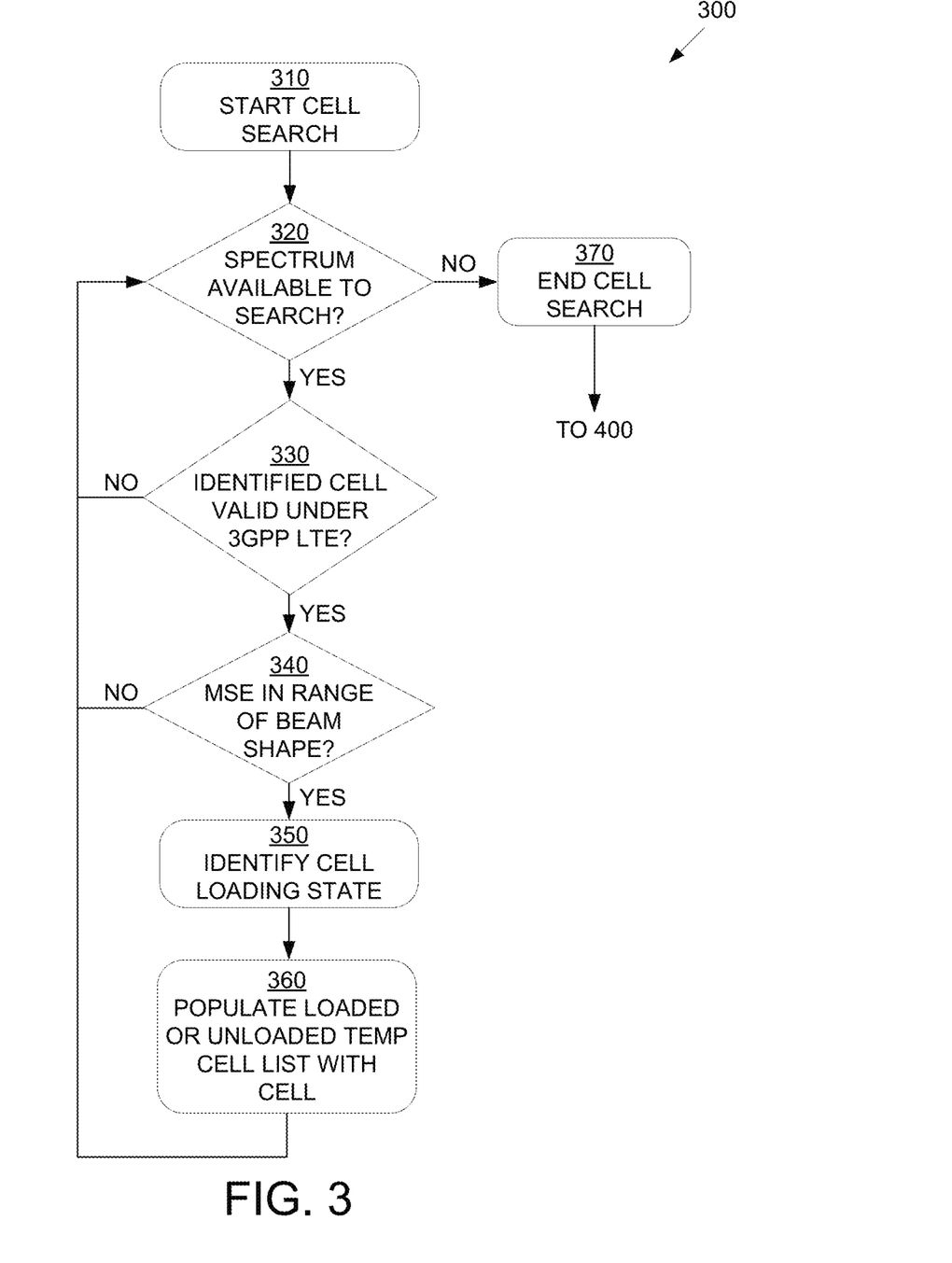
FIG. 3 depicts an example process for initial cell selection for LTE over satellite to generate candidate cell lists, according to various aspects of the subject technology.

FIG. 3 depicts an example process 300 for initial cell selection for LTE over satellite to generate candidate cell lists, or non-loaded list 142 and loaded list 144, according to various aspects of the subject technology. Process 300 begins at block 310, which may initiate when MSE 110 selects a new PLMN to obtain network service and stored list 148 is empty. Otherwise, stored list 148 may be processed to determine a candidate cell for camping, e.g. for re-selection. In some implementations, the loading indicator associated with a current or previously camped cell may be compared with a loading indicator associated with the candidate cell for re-selection to determine whether to re-select, for example by avoiding a re-selection of a loaded cell while the currently camped cell is not loaded. Further, when location sensor 150 is available, MSE 110 may perform a cell range validation to verify whether a location of MSE 110 is within beam shape 186. When the location of MSE 110 is determined to be out of cell bounds, the cell may be treated as a barred cell. When location sensor 150 is not available, MSE 110 may skip the cell range validation. Process 300 proceeds to block 320.

At block 320, MSE 110 determines whether there are additional frequencies to check within the selected spectrum. For example, MSE 110 may scan a frequency range defined for LTE, such as the entire 35 MHz spectrum. If no further spectrum bands are available to scan, then process 300 may end at block 370 and proceed to process 400 described in FIG. 4A. Otherwise, process 300 may continue to block 330.

At block 330, MSE 110 may identify a candidate cell, including an associated beam identifier and cell identifier. MSE 110 may perform checks according to the 3GPP LTE standards to determine whether the candidate cell is valid for camping, such as whether the candidate cell is: (1) not barred, (2) not part of a forbidden tracking area, (3) meets S-Criterion, and (4) is part of the selected PLMN, registered, or an equivalent PLMN. This may include checks on the measured power/quality (P/Q) of the beam signal. If the candidate cell is valid, process 300 continues to block 340, otherwise process 300 returns to block 320 to find the next candidate cell.

At block 340, MSE 110 may check whether MSE 110 is within range of a beam shape 186 transmitted by SAC 160A. For example, MSE 110 may use location sensor 150 to determine whether GPS coordinates of MSE 110 is within a range of beam shape 186. If MSE 110 is within range, then process 300 continues to block 350, otherwise process 300 returns to block 320. If a location sensor 150 is unavailable, then block 340 may be bypassed into block 350.

At block 350, MSE 110 identifies a load indicator 184 for the candidate cell. For example, as described above, load indicator 184 may be a binary indicator for either loaded or not loaded that is transmitted as metadata from SAC 160A to MSE 110. Process 300 continues to block 360.

At block 360, MSE 110 populates either non-loaded list 144 or loaded list 144 in temp cell list 140 with the candidate cell based on load indicator 184 identified in block 350. For example, when load indicator 184 indicates a loaded cell, then the candidate cell is added to loaded list 144, whereas when load indicator 184 indicates a non-loaded cell, then the candidate cell is added to non-loaded list 142. Recall that in block 320, each cell identifier may also be associated with a beam identifier. Accordingly, non-loaded list 142 and loaded list 144 may be organized as lists of beams each having a list of cells within each beam. The cells within a particular beam may be assumed to have the same P/Q rating, which may also be stored in the lists. Process 300 then returns to block 320.

Figure 4A:
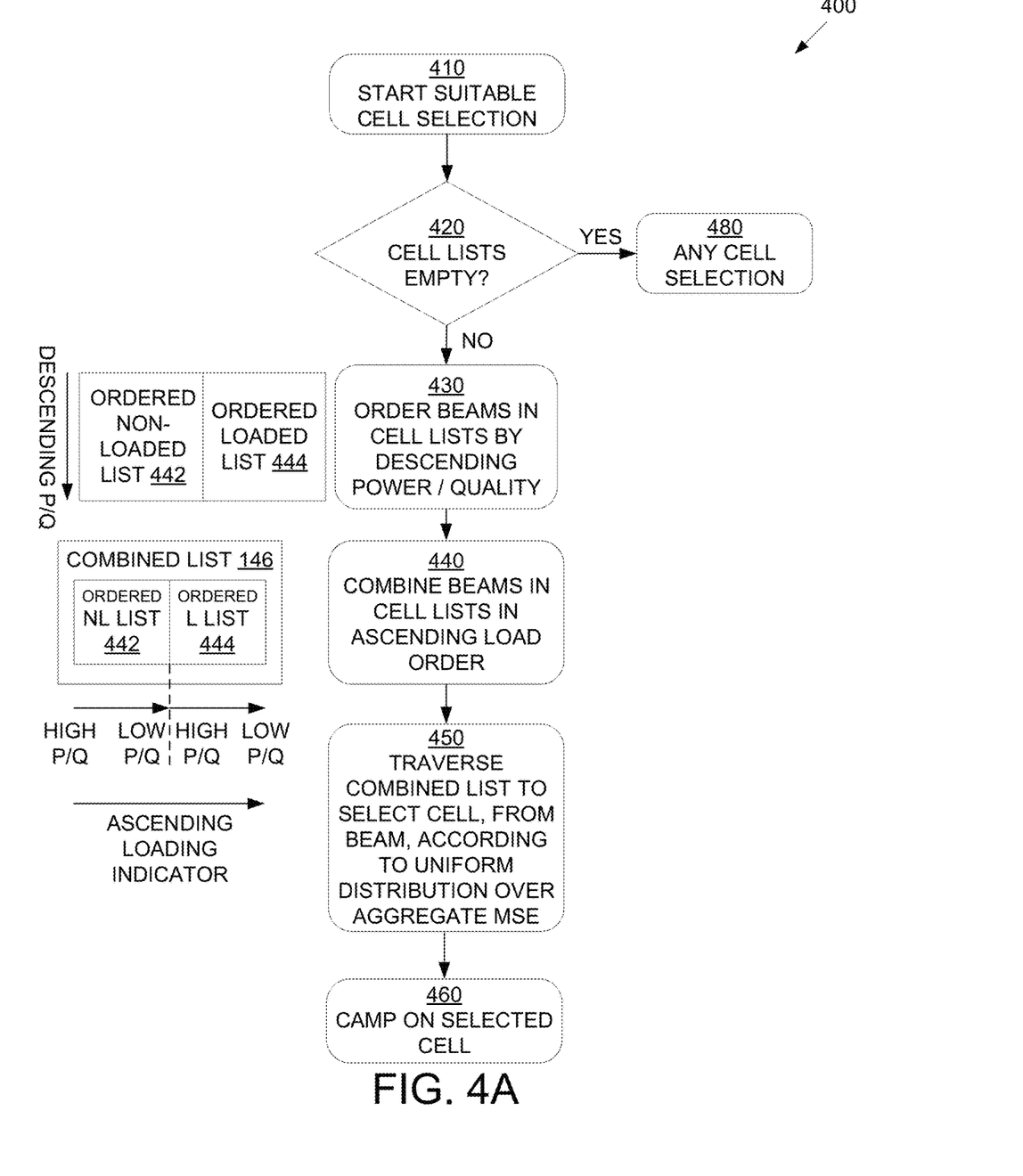
FIG. 4A depicts an example process for suitable cell selection for LTE over satellite to generate a combined cell list from the candidate cell lists, according to various aspects of the subject technology.

FIG. 4A depicts an example process 400 for suitable cell selection for LTE over satellite to generate a combined cell list, or combined list 146, from the candidate cell lists, or non-loaded list 142 and loaded list 144, according to various aspects of the subject technology. After process 300 completes at block 370, MSE 110 may begin at block 410 and proceed to block 420 of process 400.

At block 420, MSE 110 determines whether both non-loaded list 142 and loaded list 144 are empty, or in other words if process 300 failed to find any valid cells for camping. If this is the case, process 400 may continue to block 480, or any cell selection, which may correspond to repeating process 300. In some implementations, the removed cells in block 340 may instead be tracked and restored to avoid the overhead of repeating process 300. This may, for example, enable MSE 110 to quickly reestablish a connection to a nearby candidate cell when MSE 110 moves within range of the candidate cell. Otherwise, if non-loaded list 142 or loaded list 144 includes at least one candidate cell, then process 400 continues to block 430.

At block 430, MSE 110 orders the beams in each of non-loaded list 142 and loaded list 144 by descending P/Q to result in ordered non-loaded list 442 and ordered loaded list 444. Thus, the beams with the highest P/Q are listed first, and the beams with the lowest P/Q are listed last, as indicated by the descending P/Q arrow. For purposes of illustration, it is assumed that both non-loaded list 142 and loaded list 144 have at least one candidate cell. However, if one of the lists is empty, then processing for the empty list can be bypassed in process 400.

Figure 5:
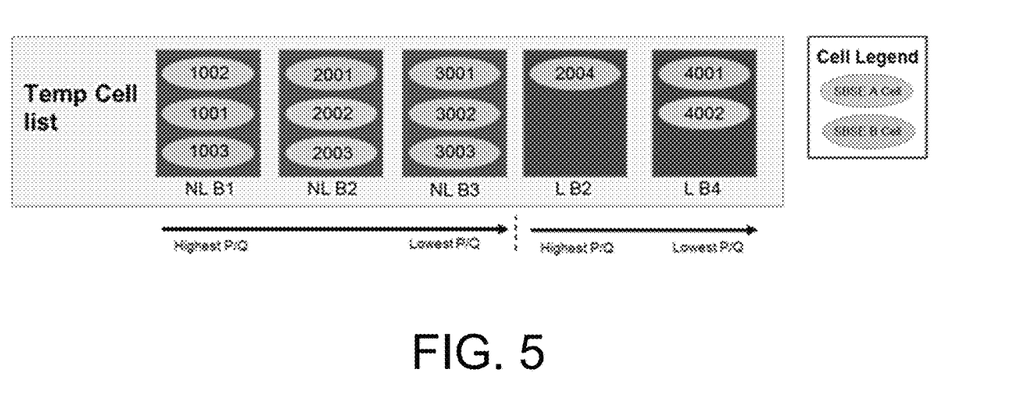
FIG. 5 depicts an example data structure of a combined cell list for LTE over satellite, according to various aspects of the subject technology.

At block 440, MSE 110 combines the ordered NL list 442 and the ordered L list 444 in ascending load order into combined list 146. For example, not loaded may be interpreted as corresponding to load level 0, and loaded may be interpreted as corresponding to load level 1. In this case, ordered NL list 442 is listed first (load level 0), followed by ordered L list 444 (load level 1), to provide an ascending load order as indicated by the ascending loading indicator arrow. Thus, it can be seen that the beams in combined list 146 are organized in the following order: (1) NL high P/Q, (2) NL low P/Q, (3) L high P/Q, (4) L low P/Q. If one of the lists is empty, then the other list corresponds to the combined list 146. An example of the structure of combined list 146 is shown in FIG. 5.

At block 450, MSE 110 traverses the combined list 146 to select a cell, from a beam, according to a uniform distribution function over MSE in aggregate. MSE 110 may traverse each of the beams in combined list 146 in order, and traversing the cells in each beam according to a uniform distribution function for MSE in aggregate. For example, each MSE may use a random or pseudo-random number to determine an ordering of cell traversal within each beam. The random number may be processed through a function having a uniform distribution, such as a hash function, to provide an approximately uniform distribution of cell traversal orders within beams by MSE in aggregate. The random number may, for example, be based on a hardware identifier associated with each MSE. For example, a subscriber identifier or a device serial number associated with MSE 110 may be processed through a hash function, and the result may be used to determine a traversal order of cells within each beam. Once the traversal order has been determined, the first cell is selected for camping.

At block 460, MSE 110 camps on the identified valid cell from block 450.

Figure 4B:
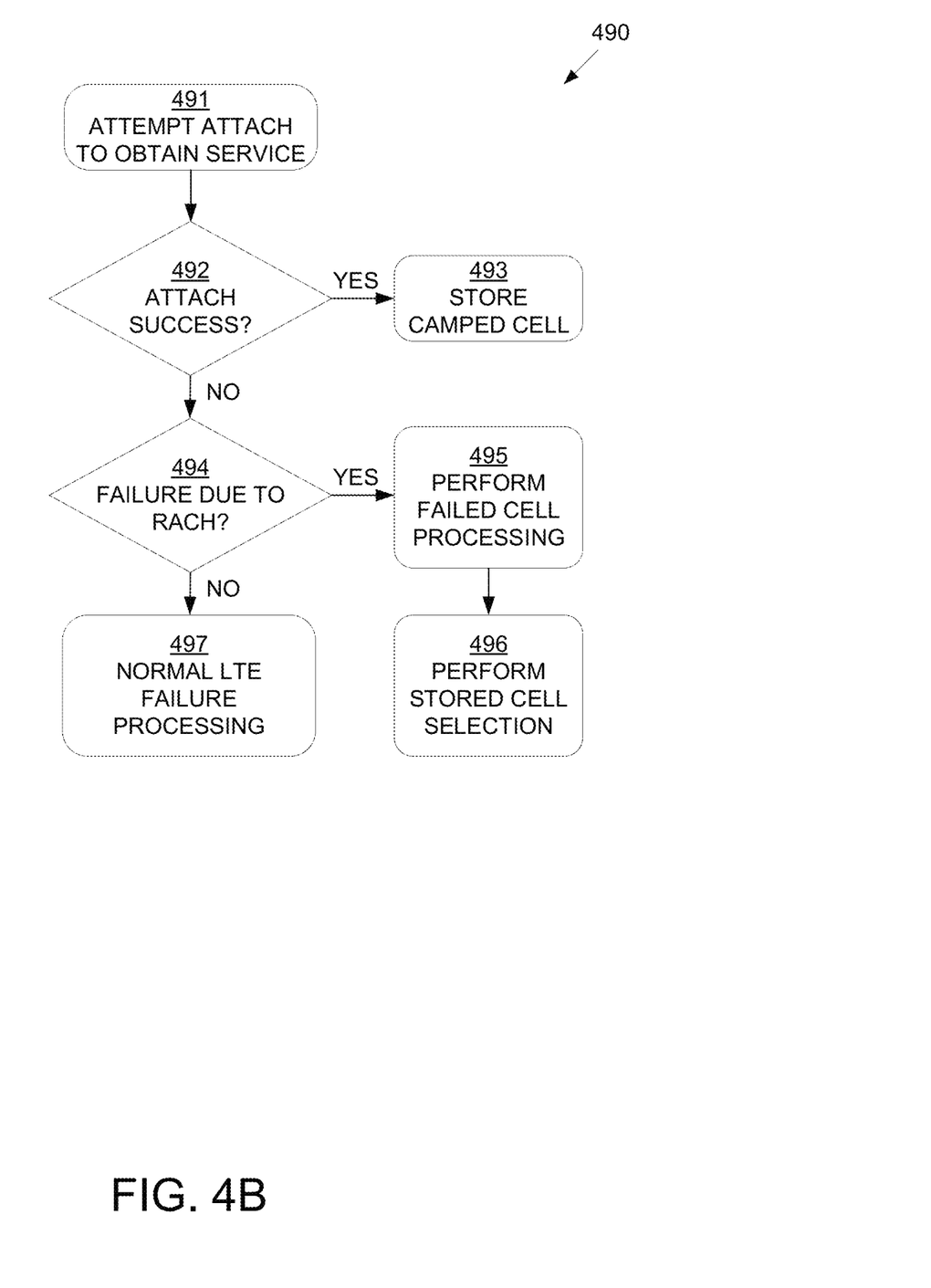
FIG. 4B depicts an example process for temp cell list processing to obtain service after camping on a selected cell, according to various aspects of the subject technology.

FIG. 4B depicts an example process 490 for temp cell list processing to obtain service after camping on a selected cell, according to various aspects of the subject technology. After process 400 completes at block 460, MSE 110 may begin at block 491 of process 490.

At block 491, MSE 110 attempts to attach to obtain network service.

At block 492, if MSE 110 attaches successfully, then process 490 proceeds to block 493. Otherwise, if MSE 110 fails to attach, then process 490 proceeds to block 494.

At block 493, MSE 110 stores the camped cell into the stored list 148. If the camped cell is in the temp cell list 140, then the temp cell list 140 is deleted or cleared. The temp cell list 140 may also be deleted upon completion of cell reselection to another beam, or prior to MSE 110 powering off. Accordingly, the stored list 148 is used to store cells from SBSEs in which the MSE 110 has successfully entered the Radio Resource Control (RRC) Connected State "on".

At block 494, MSE 110 determines whether the attach failure was a result of a failure on the random access channel (RACH). If this is the case, then process 490 proceeds to block 495. Otherwise, if the failure was due to another reason, then process 490 proceeds to block 497.

At block 495, MSE 110 may determine whether the camped cell is in stored list 148. If the camped cell is found in stored list 148, then the camped cell may be treated as a barred cell. Otherwise, if the camped cell is not found in stored list 148, then the camped cell and all other cells on the same beam may be deleted from temp cell list 140, as the cells may have the same RACH problem. Since MSE 110 was able to enter the RRC Connected State "on" at some previous time for the cells in stored list 148, performing the barring at block 495 allows for candidate cells to be temporarily ignored as if MSE 110 was outside the service area when stored cell selection was performed and the candidate cell was ignored or barred due to being not suitable.

At block 496, MSE 110 may perform stored cell selection. If MSE 110 is performing stored cell selection as the result of a RACH failure, then the temp cell list 140 is processed. If a new beam is being processed during the list traversal, then a uniform standard distribution is performed on the selected beam to set the cell traversal order, as in block 450. If the selected cell is not accessible per the 3GPP LTE standards, then it is deleted from the temp cell list. Once a valid cell is found, it is selected for camping. If no entries are left in the temp cell list, then the stored cell list 148 is processed. If stored cell selection is being performed for any other reason, then the stored list 148 may be processed to select a stored cell. Stored list 148 may be ordered by most recently used cells. Thus, stored list 148 may be traversed from most recently used cells to least recently used cells. If no cell is camped on during this stored list processing, then MSE 110 may proceed to Initial Cell Selection, or process 300 of FIG. 3.

At block 497, MSE 110 performs normal LTE failure processing according to LTE specifications.

The processing so far has assumed that MSE 110 has access to a SIM card. In the case when MSE 110 does not have a SIM card available, then any cell selection would perform similar processing as processes 300 and 400, but candidate cells would instead be acceptable cells. In the case of a RACH failure, similar processing to block 495 and the temp cell list processing of block 496 would be performed.

FIG. 5 depicts an example data structure of a combined cell list for LTE over satellite, according to various aspects of the subject technology. As shown in FIG. 5, the combined list includes 5 beams, which are ordered first by ascending load indicator (NL to L) and ordered second by descending P/Q order (high P/Q to low P/Q). The individual cells within each beam are traversed in an order dictated by a uniform distribution function for MSE in aggregate, as discussed above. As shown in FIG. 5, a MSE may receive beams with cells from different SBSE, or SBSE A and SBSE B.

Figure 6:
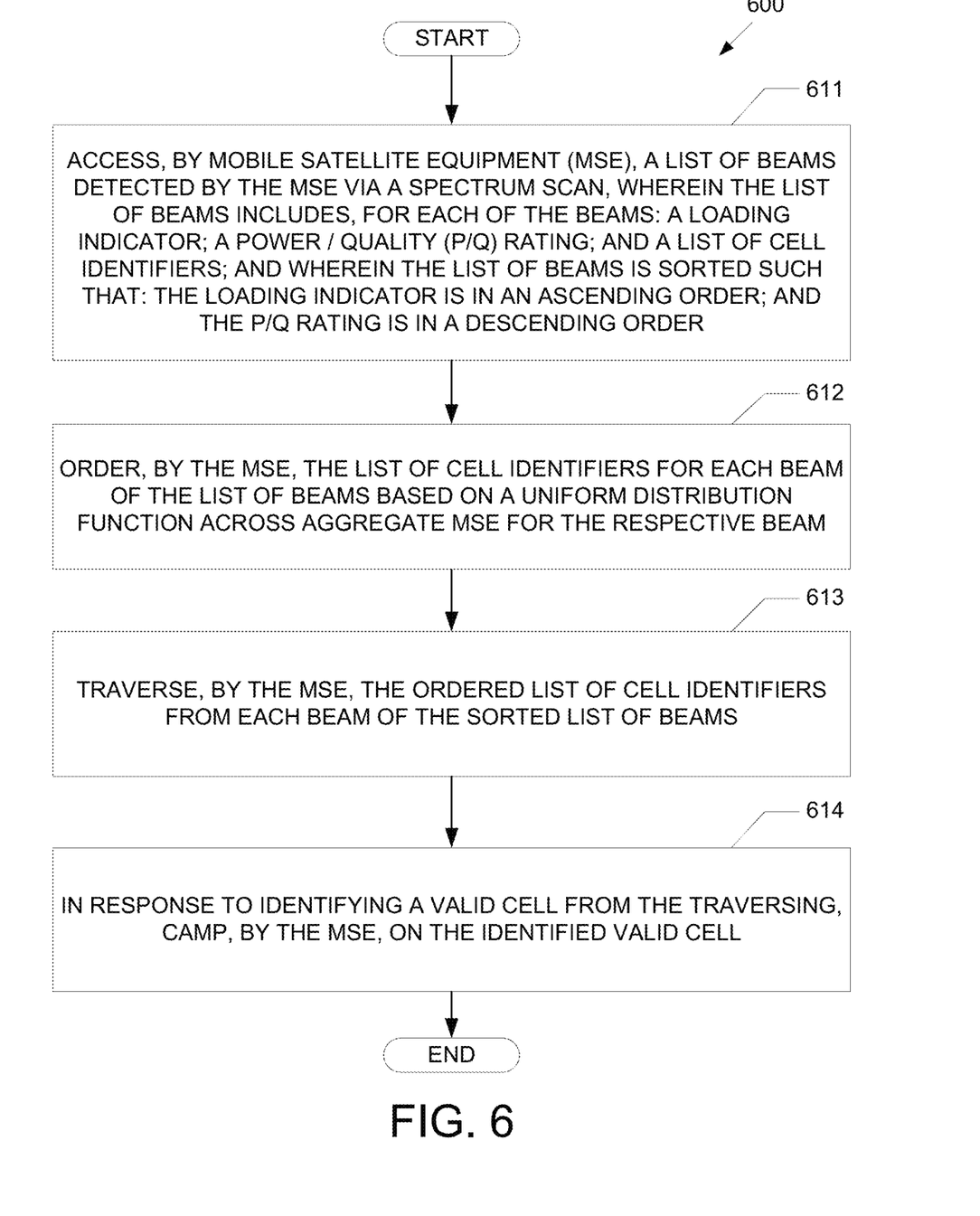
FIG. 6 depicts an example process for providing cell selection and reselection for LTE over satellite, according to various aspects of the subject technology.

FIG. 6 depicts an example process 600 for providing cell selection and reselection for LTE over satellite, according to various aspects of the subject technology. For explanatory purposes, the various blocks of example process 600 are described herein with reference to FIGS. 1-5, and the components and/or processes described herein. The one or more of the blocks of process 600 may be implemented, for example, by a computing device such as MSE 110, including processor 120 and other components utilized by the device. In some implementations, one or more of the blocks may be implemented apart from other blocks, and by one or more different processors or devices. Further for explanatory purposes, the blocks of example process 600 are described as occurring in serial, or linearly. However, multiple blocks of example process 600 may occur in parallel. In addition, the blocks of example process 600 need not be performed in the order shown and/or one or more of the blocks of example process 600 need not be performed.

In the depicted example flow diagram, MSE 110 accesses a list of beams detected by the MSE via a spectrum scan, wherein the list of beams includes, for each of the beams: a loading indicator; a power/quality (P/Q) rating; and a list of cell identifiers; and wherein the list of beams is sorted such that: the loading indicator is in an ascending order; and the P/Q rating is in a descending order (611). Referring to FIG. 2, this may correspond to MSE 110 accessing combined list 146, wherein the combined list 146 was previously created by MSE 110 using the process 300 and 400 described in FIGS. 3 and 4.

Process 600 may continue with MSE 110 ordering the list of cell identifiers for each beam of the list of beams based on a uniform distribution function across aggregate MSE for the respective beam (612). Referring to FIG. 4A, this may correspond to block 450, wherein the cells within the beams in combined list 146 are ordered according to the uniform distribution function, such as via a hash function as described above, to provide a uniform distribution across MSE in aggregate.

Process 600 may continue with MSE 110 traversing the ordered list of cell identifiers from each beam of the sorted list of beams (613). Referring to FIG. 4A, this may correspond to block 450, wherein the cells within the beams in combined list 146 are traversed to find a valid cell for camping.

Process 600 may continue with MSE 110 camping on the identified valid cell in response to identified a valid cell from the traversing (614). Referring to FIG. 4A, this may correspond to block 460.

Many aspects of the above-described example process 600, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments may be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one," unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method comprising:
   accessing, by mobile satellite equipment (MSE), a list of beams detected by the MSE via a scan of a spectrum, wherein the list of beams includes, for each of the beams:
   a loading indicator;
   a power/quality (P/Q) rating; and
   a list of cell identifiers; and
   wherein the list of beams is sorted such that:
   the loading indicator is in an ascending order; and
   the P/Q rating is in a descending order;
   ordering, by the MSE, the list of cell identifiers for each beam of the list of beams based on a uniform distribution function across aggregate MSE for the respective beam;
   traversing, by the MSE, the ordered list of cell identifiers from each beam of the sorted list of beams; and
   in response to identifying a valid cell from the traversing, camping, by the MSE, on the identified valid cell.

2. The method of claim 1, wherein the list of beams further includes, for each of the beams, a beam shape, and wherein the method further comprises:
   performing a range validation by excluding cells from the list of beams when the respective beam shape excludes a detected location of the MSE.

3. The method of claim 2, wherein the detected location of the MSE is determined using one or more location sensors of the MSE.

4. The method of claim 2, wherein the one or more location sensors comprises a Global Positioning System (GPS) sensor.

5. The method of claim 2, further comprising:
   in response to identifying no valid cells from the traversing, restoring, by the MSE, the excluded cells due to the range validation;

performing, by the MSE, another traversal of the spectrum; and in response to identifying an available cell from the another traversal, camping, by the MSE, on the identified available cell.

6. The method of claim 1, wherein the loading indicator is a binary value indicating either loaded or not loaded.

7. The method of claim 1, wherein the uniform distribution function is based on a hardware identifier of the MSE.

8. The method of claim 1, wherein the spectrum corresponds to a frequency range defined for Long Term Evolution (LTE).

9. The method of claim 1, further comprising adding, by the MSE, the identified valid cell to a stored cell list.

10. The method of claim 1, further comprising:
selecting, by the MSE, a candidate cell for reselection;
determining, by the MSE, whether to continue camping on the identified valid cell or camp on the candidate cell based on performing a range validation on the candidate cell and comparing the loading indicator associated with the identified valid cell and a loading indicator associated with the candidate cell; and
in response to determining to camp on the candidate cell, camping, by the MSE, on the candidate cell.

11. Mobile satellite equipment (MSE) comprising one or more processors configured to:
access a list of beams detected via a scan of a spectrum, wherein the list of beams includes, for each of the beams:
a loading indicator;
a power/quality (P/Q) rating; and
a list of cell identifiers; and
wherein the list of beams is sorted such that:
the loading indicator is in an ascending order; and
the P/Q rating is in a descending order;
order the list of cell identifiers for each beam of the list of beams based on a uniform distribution function across aggregate mobile satellite equipment (MSE) for the respective beam;
traverse the ordered list of cell identifiers from each beam of the sorted list of beams; and
in response to identifying a valid cell from the traversing, camp on the identified valid cell.

12. The MSE of claim 11, wherein the list of beams further includes, for each of the beams, a beam shape, and wherein the one or more processors are configured to:
perform a range validation by excluding cells from the list of beams when the respective beam shape excludes a detected location of the MSE.

13. The MSE of claim 12, wherein the or more processors are configured to detect the location of the MSE using one or more location sensors of the MSE.

14. The MSE of claim 12, wherein the or more processors are further configured to:
in response to identifying no valid cells from the traversing, restore the excluded cells due to the range validation;
perform another traversal of the spectrum; and
in response to identifying an available cell from the another traversal, camp on the identified available cell.

15. The MSE of claim 11, wherein the loading indicator is a binary value indicating either loaded or not loaded.

16. The MSE of claim 11, wherein the uniform distribution function is based on a hardware identifier of the MSE.

17. The MSE of claim 11, wherein the spectrum corresponds to a frequency range defined for Long Term Evolution (LTE).

18. The MSE of claim 11, wherein the one or more processors are further configured to:
add the identified valid cell to a stored cell list.

19. The MSE of claim 11, wherein the one or more processors are further configured to:
select a candidate cell for reselection;
determine whether to continue camping on the identified valid cell or camp on the candidate cell based on performing a cell range validation on the candidate cell and comparing the loading indicator associated with the identified valid cell and a loading indicator associated with the candidate cell; and
in response to determining to camp on the candidate cell, camp on the candidate cell.

20. A non-transitory storage medium comprising instructions that, when read by one or more processors, cause a method comprising:
accessing, by mobile satellite equipment (MSE), a list of beams detected by the MSE via a scan of a spectrum, wherein the list of beams includes, for each of the beams:
a loading indicator;
a power/quality (P/Q) rating; and
a list of cell identifiers; and
wherein the list of beams is sorted such that:
the loading indicator is in an ascending order; and
the P/Q rating is in a descending order;
ordering, by the MSE, the list of cell identifiers for each beam of the list of beams based on a uniform distribution function across aggregate MSE for the respective beam;
traversing, by the MSE, the ordered list of cell identifiers from each beam of the sorted list of beams; and
in response to identifying a valid cell from the traversing, camping, by the MSE, on the identified valid cell.

\* \* \* \* \*